United States Patent
Perlman et al.

(10) Patent No.: US 6,898,187 B2
(45) Date of Patent: May 24, 2005

(54) AUTOMATIC SELECTION OF UNIQUE NODE IDENTIFIERS IN A DISTRIBUTED ROUTING ENVIRONMENT

(75) Inventors: Radia J. Perlman, Sammamish, WA (US); Eric A. Guttman, Waibstadt G (DE)

(73) Assignee: Sun Microsystems, Inc., Santa Clara, CA (US)

( * ) Notice: Subject to any disclaimer, the term of this patent is extended or adjusted under 35 U.S.C. 154(b) by 883 days.

(21) Appl. No.: 09/726,378

(22) Filed: Nov. 30, 2000

(65) Prior Publication Data

US 2002/0093967 A1 Jul. 18, 2002

(51) Int. Cl.$^7$ .................................................. H04J 1/16
(52) U.S. Cl. ...................... 370/252; 370/394; 370/238; 709/242
(58) Field of Search ................................. 370/252, 466, 370/467, 389, 394, 238, 255, 256, 392, 400, 401; 709/238–242

(56) References Cited

U.S. PATENT DOCUMENTS

| | | | |
|---|---|---|---|
| 5,398,242 A | | 3/1995 | Perlman |
| 6,397,260 B1 | * | 5/2002 | Wils et al. .................. 709/238 |
| 2001/0052029 A1 | * | 12/2001 | Harbin |
| 2002/0052960 A1 | * | 5/2002 | Trisno et al. |
| 2002/0075838 A1 | * | 6/2002 | Uematsu |
| 2003/0088673 A1 | * | 5/2003 | White et al. |

OTHER PUBLICATIONS

Webopedia Definitions and Links, http://webopedia.internet.com/TERM/brouter.html.

Sidhu et al., "Inside Apple Talk", Second Edition, Chapters 1, 4 and 5, Addison–Wesley Publishing Company, Inc., 1990.

Troll, Ryan, "Automatically Choosing an IP Address in an Ad–Hoc IPv4 Network", IETF Dynamic Host Configuration WG, Internet Draft Document, Apr. 14, 1999.

Thompson, S., "IPv6 Stateless Address Autoconfiguration", IETF Network WG, RFC 2462, Dec. 1998.

Seifert, W.M., "Integrated routing (and bridging)," Local Computer Networks, 1989, Proceedings 14$^{th}$ Conference on, Minneapolis, MN, USA Oct. 10–12, 1989, IEEE Computer Society, pp. 270–277.

* cited by examiner

Primary Examiner—John Pezzlo
(74) Attorney, Agent, or Firm—Kudirka & Jobse, LLP

(57) ABSTRACT

To ensure uniqueness of a router identifier in routing protocol messages (RPMs), a router determines whether an identifier $ID_R$ in received RPMs is the same as an identifier $ID_S$ in RPMs originated by the router. For RPMs having the same identifier, sequence information such as a sequence number is compared with sequence information in the RPM most recently originated by the router, the comparison indicating whether the received RPM appears to have been originated more recently. The rate at which such RPMs are being received is monitored. If the rate is above a predetermined threshold rate, the router infers that another router is using the same identifier, and selects a different identifier for subsequent use. The sequence information preferably includes a checksum calculated over contents of the message including a random number, to ensure proper flooding of each message to other routers that may be using a duplicate identifier.

11 Claims, 3 Drawing Sheets

AUTOMATIC SELECTION OF UNIQUE
NODE IDENTIFIERS IN A DISTRIBUTED
ROUTING ENVIRONMENT

CROSS REFERENCE TO RELATED
APPLICATIONS

None

STATEMENT REGARDING FEDERALLY
SPONSORED RESEARCH OR DEVELOPMENT

Not Applicable

BACKGROUND OF THE INVENTION

The present invention is related to the field of data networks, and more particularly to the operation of routing protocols used in data networks.

In data networks, routing protocols are used to provide for timely and efficient routing of user messages, such as user data packets. In general, the routing involves maintaining a model of the topology of the network, which can change dynamically, and choosing paths for routing messages in a manner that takes into consideration several criteria or overall goals for network operation. The criteria generally include, for example, minimizing the number of different network nodes that a message must traverse, minimizing overall delay of a message, avoiding points of congestion or outage in the network, etc.

It is important that the devices that carry out routing protocols, referred to as "routers" herein, receive information from a variety of points in the network, to maintain an accurate model of the network and thereby maximize routing efficiency. This information exchange is accomplished using a set of routing protocol messages. For example, distributed routing protocols such as the Intermediate System to Intermediate System (IS—IS) and Open Shortest Path First (OSPF) protocols employ neighbor discovery packets and link state packets (LSPs) to convey information from one router to another. Each router uses information in these packets to maintain a local routing database, calculates routes for user data messages based on the information in the routing database, and forwards the user messages along the calculated routes.

Within the routing database, different network segments are identified using distinct identifiers, and the information related to each segment is stored in association with that segment identifier. In some protocols, each network segment can be associated with a particular router, and therefore an identifier of the router can serve as an identifier of the segment. To maintain an accurate network model in the routing database, it is important that identifiers be uniquely assigned to segments or routers. If an identifier is used to identify two different routers in the network, for example, then it is possible that the information in the routing database for either or both of these routers is not accurate at any given time. In such a case, routing performance can suffer, and therefore overall performance of the network can suffer.

Administratively assigned Equipment Unique Identifiers (EUIs) have been used to uniquely identify routers in network protocol messages. Examples include 48-bit EUIs referred to as "EUI-48 identifiers", and more recently 64-bit EUIs referred to as "EUI-64 identifiers". An EUI-48 identifier is divided into two fields. An upper 24 bit field holds a value that uniquely identifies an equipment manufacturer on a global basis. The lower 24 bit field is an index into a block of identifiers that can be used by each manufacturer. Assuming that the administrative processes for assigning these identifiers are followed correctly, it is guaranteed that any single EUI-48 identifier is unique on a global basis. Hence, in a network in which EUI-48 identifiers have been assigned to the routers, the EUI-48 identifiers can be used reliably as unique router identifiers.

Reliance upon pre-assigned identifiers such as EUI-48 identifiers may be undesirable in some cases, however. There is cost associated with the administrative bookkeeping required to guarantee uniqueness, and mistakes in the assignment of identifiers are sometimes made. In many cases there is no well-defined process for detecting and correcting the erroneous duplication of identifiers. And in some cases, pre-assigned identifiers may not have been made available for use by network components such as routers.

BRIEF SUMMARY OF THE INVENTION

Consistent with the present invention, a method by which a router automatically selects a unique identifier to identify itself in routing protocol messages (RPMs) originated by the router in a network is disclosed. The method can be used in place of, or as a supplement to, an administrative identifier assignment procedure. The potential existence of duplicate identifiers in a network is detected, and different identifiers are automatically selected to avoid such duplicate use.

In the disclosed method, a router examines received RPMs to determine whether an identifier $ID_R$ in each received RPM is the same as an identifier $ID_S$ currently used by the router to identify itself in RPMs originated by itself. For those received RPMs having the same identifier, sequence information in the received RPM is compared with sequence information in the RPM most recently originated by the router. The sequence information can take the form of a sequence number that increases monotonically over a sequence of RPMs, for example. The result of this comparison indicates whether the received RPM appears to have been originated more recently than the RPM most recently originated by the router.

Under some normal operating conditions, a router may receive RPMs it previously originated. Therefore, further processing is performed to determine whether these received RPMs have in fact been generated more recently. The router monitors the rate at which RPMS having a matching identifier $ID_R$ and appearing to have been originated more recently are being received. If the rate is at or below a predetermined threshold rate, it is inferred that the received RPMs were previously generated by this router, and therefore do not reflect any duplicate use of the router's ID in the network. However, if the rate is above the threshold rate, the router infers that another router is using the same identifier, and proceeds to select a different identifier for subsequent use in identifying itself in its routing protocol messages.

The above method substantially ensures that the duplicate use of router identifiers is avoided. The method is carried out in an automatic and distributed fashion, reducing the need for involvement of network personnel in this aspect of network operation.

The disclosed method operates in a link state routing environment, in which the routing protocol messages carrying the information used in the duplicate ID checking are link state messages that are flooded to all routers in a network. Under certain conditions, the duplicate use of a given router ID could be masked by the algorithm used to flood these link state messages. To address this situation, the sequence information in each message includes a checksum calculated over predetermined contents of the message, including a random number generated for each message by the originating router. The use of this checksum ensures that link state messages are propagated to routers that are potentially using the same ID, to enable the router to detect this situation and take appropriate action.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
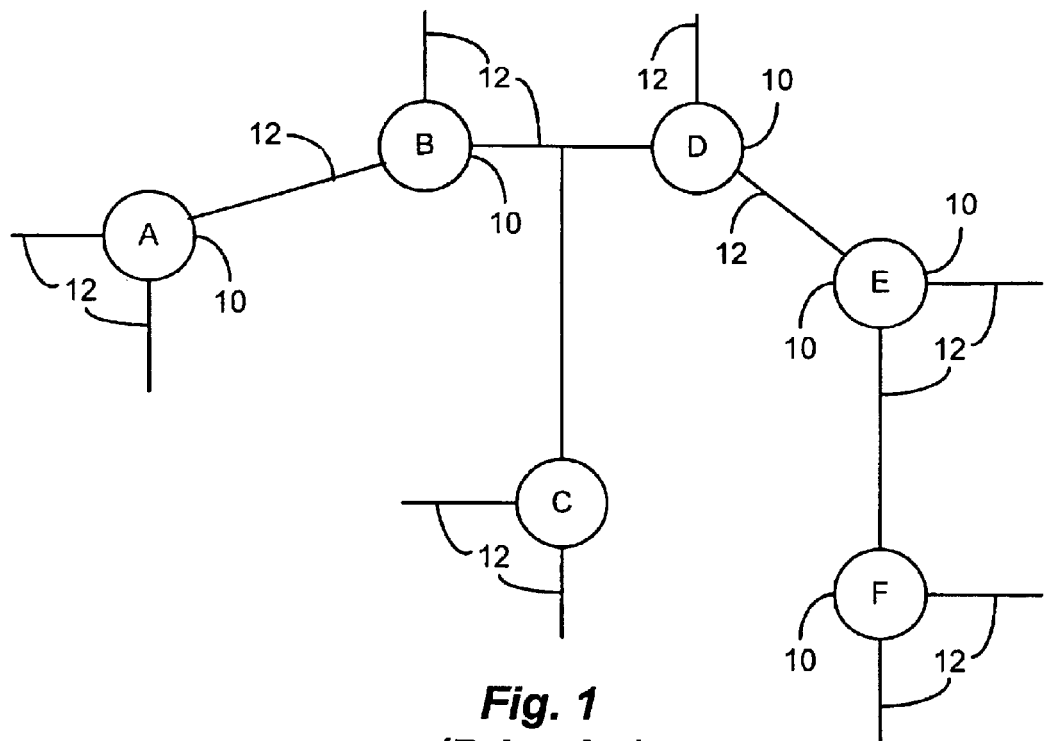
FIG. 1 is a diagram showing an example network having routers and network segments arranged as known in the art.

FIG. 1 shows an exemplary network including a number of routers 10 labeled A, B, C, D, E and F. Each router 10 is connected to one or more network links 12, which may be for example Ethernet local area network (LAN) segments. It will be appreciated that one or more "hosts" or end nodes are generally connected to each link 12. However, these are omitted from FIG. 1 for clarity.

The routers 10 employ a link state routing protocol for routing messages through the network from source to destination nodes. Well known examples of such protocols include the Intermediate System to Intermediate System (IS—IS) and the Open Shortest Path First (OSPF) protocols. The presently disclosed automatic identifier selection method employs link state signaling mechanisms used in these protocols, particularly neighbor discovery packets and link state packets (LSPs), for its operation.

More particularly, each router 10 engages in the following functions in the link state protocol:
1. Generating neighbor discovery packets, referred to as "HELLO" packets, and sending these packets to neighboring routers. Neighboring routers are those routers that are one routing hop away from a routing perspective.
2. Generating LSPs on behalf of itself and multicasting these packets on all connected links.
3. Receiving LSPs and HELLO packets, forwarding received LSPs to other routers that have not yet received them, and using the information contained in these packets to maintain a link state routing database.

Figure 2:
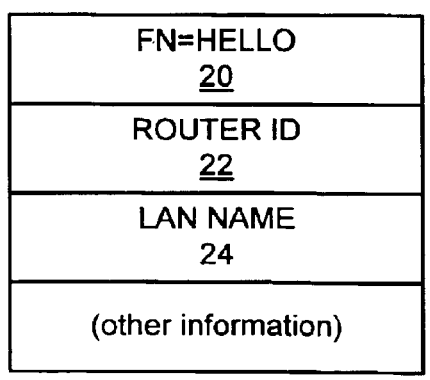
FIG. 2 is a diagram of a known routing protocol message referred to as a "Hello" packet used in a network such as the network of FIG. 1.

FIG. 2 shows the structure of the HELLO packets. A function (FN) field 20 has a value indicating that the packet is a HELLO packet. A second field 22 holds a router identifier (ID) that identifies the router 10 issuing the HELLO packet. A commonly used ID is referred to as a 48-bit Equipment Unique Identifier, or EUI-48 identifier. By specification, the upper 24 bits of EUI-48 identifiers uniquely identify an equipment manufacturer on a global basis. The lower 24 bits are allocated by each manufacturer to identify each addressable network interface component that it produces, such as a network interface card or integrated circuit. In Ethernet parlance, EUI-48 identifiers are referred to as "media access controller addresses" or "MAC addresses". There is also a more recently adopted set of 64-bit identifiers referred to as EIU-64 identifiers, which form a superset of EUI-48 identifiers to achieve backwards compatibility with existing equipment.

A third field 24 in HELLO packets holds a LAN Name value whose definition depends on the source of the packet. Both the IS—IS and OSPF protocols employ a "designated router" or DR on each link to perform certain special functions on behalf of the link in addition to the normal functions of a router. The DR for each link is self-selected in accordance with a known distributed election algorithm, relying in part on the contents of the HELLO packets generated by all the routers on the link. The DR for each link assigns a one-byte link identifier to the link, which uniquely identifies the link within the DR. For example, this identifier may be a port number identifying a port of the DR that is connected to the link. When issuing a HELLO packet on behalf of a link, a DR forms the LAN Name by appending its EUI-48 router ID to the one-byte link identifier. Thus, assuming uniqueness of router IDs and of the one-byte link identifiers within each DR, each LAN Name 24 is also globally unique. In HELLO packets generated by non-DR routers or by DR routers on their own behalf, all bytes of the LAN Name 24 are set to zero.

Figure 3:
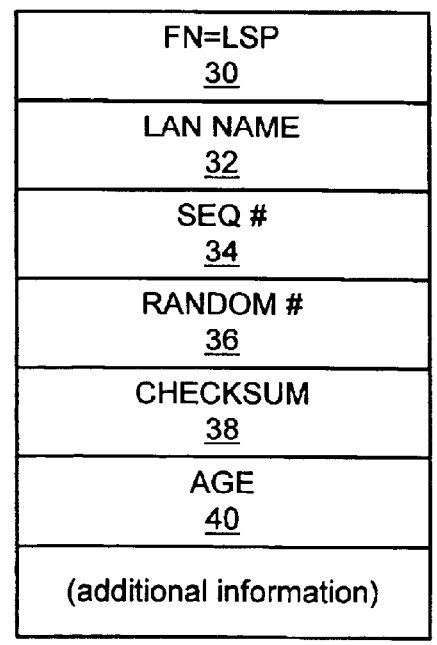
FIG. 3 is a diagram of a routing protocol message according to the invention referred to as a link state packet (LSP) used in a network such as the network of FIG. 1.

FIG. 3 shows the structure of a link state packet (LSP). A function (FN) field 30 indicates that the packet is an LSP packet. A second field 32 contains a LAN Name, which is formed by the same rules as described above for HELLO packets. A sequence number field 34 holds a "sequence number" assigned by a router to each LSP it generates. The sequence number is incremented for each successive LSP. A random number is generated and placed in a random number field 36. A checksum field 38 holds a checksum value calculated over various fields of the LSP, including the LAN Name field 32 and the random number field 36. An age field 40 holds an age value that is used as part of a refresh mechanism described below.

In the IS—IS and OSPF routing protocols, each router is responsible for maintaining a link state database containing a variety of information. In particular, each router maintains a copy of what it believes to be the most recently generated LSP that it has received for each other router in the network. Additionally, the routers maintain state information used to conduct a "flooding" operation by which LSPs are distributed throughout the network. This information can be thought of as being arranged in a table as follows:

| LSP | Neigh. 1 | Neigh. 2 | Neigh. 3 | Neigh. 4 |
|---|---|---|---|---|
| LSP_A | flag_A1 | flag_A2 | flag_A3 | flag_A4 |
| LSP_B | flag_B1 | flag_B2 | flag_B3 | flag_B4 |
| LSP_C | flag_C1 | flag_C2 | flag_C3 | flag_C4 |
| LSP_D | flag_D1 | flag_D2 | flag_D3 | flag_D4 |
| LSP_E | flag_E1 | flag_E2 | flag_E3 | flag_E4 | where "LSP_x" denotes LSPs of originated by different source routers, "Neigh. x" refers to different neighbors of the router maintaining the table, and "flag_xx" refers to a flag variable used to control the flooding of the LSP for each LSP/Neighbor pair. The flag variable can have the values OK or XMIT. It should be noted that each router keeps a copy of its own most recent LSP, in addition to the LSPs for other routers, to perform certain functions described below.

In general, changes are made to the link state database in a given router in response to messages such as LSPs that are received from other routers and in response to actions taken by the router independently. The manner in which the contents of the link state database are changed in response to received LSPs is described below with reference to FIG. 4. Examples of independent actions include the initial insertion of a router's own LSP into the database, and the updating of stored LSPs in response to locally-detected events. For example, the age variable 40 is used to periodically force the re-transmission of each LSP in the database to refresh the contents of the link state databases in all routers, thereby minimizing any reliance upon stale data. When an LSP is first put into the database, its age 40 is set to a predetermined value in seconds, such as 7200. At convenient intervals, such as every second, the ages of all the LSPs in the database are decremented. When the age for an LSP reaches zero, the age is reset to the initial predetermined value, and the database flags for all neighbors for that LSP are set to XMIT. As described below, this action causes the subsequent forwarding of the LSP to all the neighbors of the router.

Each router periodically scans the entries of its link state database. When a flag_xx variable having the value XMIT is encountered, the corresponding LSP is forwarded to the corresponding neighboring router. As an example using the above table, when flag_C4 has the value XMIT, LSP_C is transmitted to Neighbor 4. Once the LSP has been transmitted, the flag_xx variable for the entry is set to OK. As described below, the receipt of this LSP at the neighboring router generally results in an update to that router's database, and a subsequent forwarding of the updated LSP to yet another router. This cascading effect is what is referred to by the term "flooding" previously mentioned.

The flag_xx variable may also be used to detect whether the transmission of an LSP to a neighbor is successful. In this case, a third state value is also used, which can be referred to as ACK. When an LSP is transmitted, the flag_xx variable is set to ACK, indicating that the transmitting router is awaiting receipt of an acknowledgment message from the receiving router. When the acknowledgment message is received, the flag_xx variable is then set to OK. If the acknowledgment message is not received within some predetermined time, the flag_xx variable is reset to XMIT, resulting in its eventual re-transmission to the neighboring router.

Link state signaling according to the OSPF or IS—IS protocols relies on the ability of the router ID in the LAN Name 32 to unambiguously indicate the source of an LSP. Only one LSP per LAN Name is stored in the link state database. If two or more routers use the same LAN Name 32, there may be missing or conflicting entries in the routing databases of different routers, potentially causing any of a number of negative effects on network operation. Therefore, it is very important that the router ID be unique among the routers participating in the protocol, i.e., routers that are operating to maintain coherent copies of the same link state information.

The requirement for unique router IDs is easily met when pre-assigned EUI-48 or EUI-64 identifiers are used. As described above, these numbers are assigned in a manner that is intended to guarantee uniqueness. Therefore, as a general matter, the uniqueness of EUI identifiers can be relied upon.

In some cases, however, one or more routers participating in a link state protocol may not have pre-assigned EUI identifiers, in which case such router(s) may select their own router IDs autonomously. A router can do this, for example, by randomly selecting a number from the locally assigned EUI space (i.e., the set of EUIs allocated to the manufacturer of that router). Alternatively, a router may have an assigned EUI identifier that is known or suspected to be a duplicate. In either case, a mechanism is required for checking whether a selected ID is a duplicate, and selecting another ID when a duplicate is detected. A mechanism for duplicate ID detection and selection of new IDs is described below in the context of the processing of received LSPs.

Figure 4:
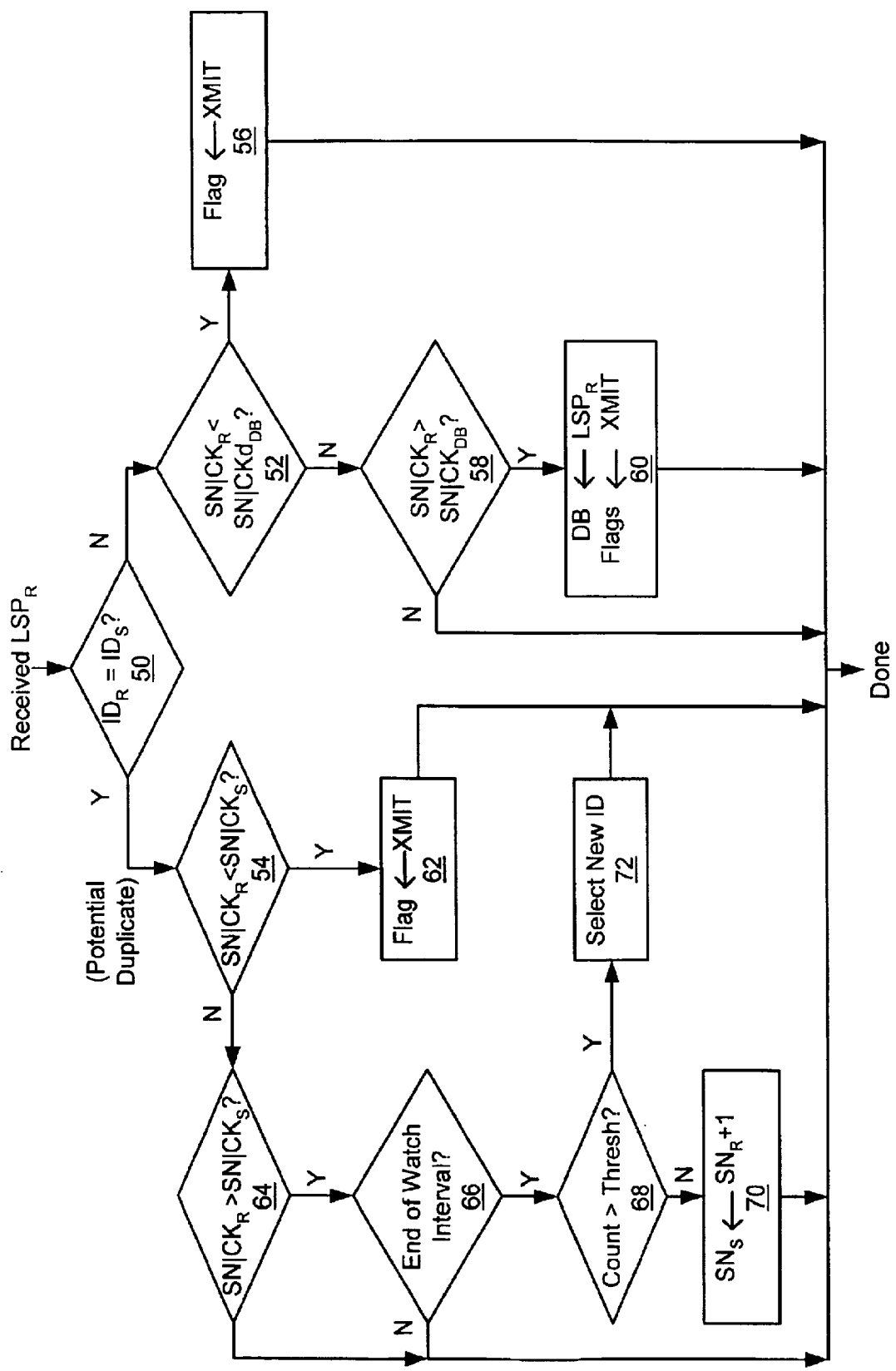
FIG. 4 is a flow diagram showing the manner in which an LSP such as shown in FIG. 3 is processed upon receipt by a router in a network such as the network of FIG. 1.

FIG. 4 shows the processing of a received LSP at a router. In FIG. 4, the subscript "R" is used to identify items in the received LSP, the subscript "S" is used to identify items in the LSP of the receiving router, and the subscript "DB" is used to identify items in an LSP stored in the link state database. For purposes of the description below, it is assumed that $LSP_R$ has been received from neighbor "N".

At step 50, the ID values (from the LAN Names 32) of $LSP_R$ and $LSP_S$ are compared for equality. If they are not equal, it is concluded that $LSP_R$ is from another router, and processing proceeds to step 52. If the IDs are equal, there is the potential that another router is using the same ID as this router. In this case, processing proceeds to step 54.

At step 52, the concatenation of the sequence number (SN) 34 and checksum (CK) 38 from $LSP_R$ (shown as "$SN|CK_R$") is compared with the same value from the LSP stored in the database having the same router (shown as "$SN|CK_{DB}$"). If the value from $LSP_R$ is smaller, then it is inferred that neighbor N has an outdated copy of $LSP_{DB}$. Processing proceeds to step 56, in which the flag_xx variable for the pair ($LSP_{DB}$, neighbor N) is set to XMIT. As described above, this action eventually causes $LSP_{DB}$ to be sent to neighbor N to update neighbor N's database.

If at step 52 the value $SN|CK_R$ is not less than $SN|CK_{DB}$, then processing proceeds to step 58, where it is determined whether $SN|CK_R$ is greater than $SN|CK_{DB}$. If not, it is inferred that $LSP_R$ and $LSP_{DB}$ are identical, and therefore the local database is up to date. No further action is taken. If at step 58 it is determined that $SN|CK_R$ is greater than $SN|CK_{DB}$, it is inferred that $LSP_R$ is newer than $LSP_{DB}$. In this case, $LSP_R$ replaces $LSP_{DB}$ in the database, and all the flag_xx variables for $LSP_{DB}$ (except for neighbor N) are set to XMIT. As a result, the new LSP is eventually sent to all other neighboring routers as part of the flooding mechanism.

Returning to step 54, which is performed when the ID of the received LSP is equal to this router's ID, the value $SN|CK_R$ is compared with $SN|CK_S$. If the value from $LSP_R$ is smaller, then it is inferred that neighbor N has an outdated copy of $LSP_S$. Processing proceeds to step 62, in which the flag_xx variable for the pair ($LSP_S$, neighbor N) is set to XMIT. This eventually causes $LSP_S$ to be sent to neighbor N to update neighbor N's database.

If at step 54 the value $SN|CK_R$ is not less than the value $SN|CK_S$, processing proceeds to step 64, in which it is determined whether the value $SN|CK_R$ is greater than $SN|CK_S$. If not, it is inferred that the two values are equal, and that therefore $LSP_R$ is the same as $LSP_S$. No further action is taken.

If at step 64 it is determined that the value $SN|CK_R$ is greater than $SN|CK_S$, one of two conditions may exist. One condition is that $LSP_R$ was previously generated by this router and is still circulating in the network, but there has been an intervening event that has caused this router to re-set its sequence numbers and to forget that it ever issued $LSP_R$.

The best example of such an event is an outage of the router. The other possible condition is that $LSP_R$ has been generated by another router using an ID that is a duplicate of this router's ID. In either case, appropriate action is required.

While it can be difficult to differentiate these two cases, certainty in doing so is not necessarily required. A router could be biased toward selecting a new ID if doubt exists, without causing undue harm in the network. Biasing in favor of selecting a new ID helps to reduce the possibility that duplicate IDs are in use. In some cases, a new ID is selected when in fact the router is only seeing its own older LSPs. The primary drawback of such operation, which will be understood from the additional description of LSP processing below, is permitting the older LSP to continue to exist rather than immediately taking steps to flush it from the network. However, other mechanisms can be relied upon to ensure that the older LSP is eventually flushed. Nevertheless, it may be preferable to avoid selecting a new ID if possible, in order for example to make efficient use of the pool of identifiers, to promote stable network operation, etc. Accordingly, it can be useful to perform further processing to differentiate these two cases.

In FIG. 4, this further processing takes the form of monitoring the frequency of occurrence of this ambiguous situation over some predetermined interval. If it occurs too frequently, it is inferred that there is another active router that is using a duplicate ID. Otherwise, it is inferred that the received LSPs are stale LSPs previously originated by this router, and action is taken to purge them from the network.

A timer (not shown) is used to establish a "watch interval". It is assumed that the watch interval is started (by logic not shown in the Figures) when the "yes" condition of step 64 is satisfied but no current watch is in progress. Also, a counter (not shown) is used to count the number of occurrences of the "yes" condition of step 64 for multiple LSPs received during a pending watch interval. The counter and timer measure the frequency of occurrence of this condition. A predetermined threshold value is established that is used to differentiate the above-described cases. If the condition occurs infrequently over a given period, it is inferred that $LSP_R$ is a stale LSP previously generated by this router. If the condition occurs too frequently over the period, it is inferred that $LSP_R$ is in fact the LSP of another router using a duplicate ID.

More specifically, at step 66, it is determined whether the end of a watch interval has been reached. If not, no action is taken beyond incrementing the above-mentioned counter. If the end of a watch interval has been reached, then at step 68 the count is compared with the predetermined threshold. If the count does not exceed the threshold, processing proceeds to step 70. By convention, the router sets the sequence number of its current LSP ($LSP_S$) to a value one greater than the sequence number of $LSP_R$, and re-sets all the flag_xx values for $LSP_S$ to XMIT. This action causes subsequent flooding of the new $LSP_S$, which has the effect of replacing $LSP_R$ with the new $LSP_S$ in the databases of the other routers in the network.

If at step 68 the count is determined to be greater than the threshold, it is inferred that another router is using the same router ID. Processing proceeds to step 72, at which the router selects a new ID. This can be done in any of a variety of ways. If the identifier space is sufficiently large, it may be convenient for the router to simply generate a new ID at random. If the selection is done at random, it is necessary to continue with duplicate ID detection to make sure that the selected ID is not also in use. The ID can also be chosen in other ways, and duplicate ID checking can be continued or not as may be desirable.

It should be noted that there may still be cases in which inferring the existence of a duplicate may be incorrect, so that the router ID is changed unnecessarily. If the threshold used in the process of FIG. 4 is set correctly, this situation should be encountered only infrequently. If even greater accuracy is desired, however, it may be desirable to perform additional checking in a manner that reliably distinguishes such cases, in order to avoid changing identifiers unnecessarily. The process of FIG. 4 has the advantages of simplicity and good protection of the integrity of the link state database.

The process described above has a feature that overcomes a potential problem with relying on LSP flooding to detect duplicate IDs. The problem is first described below, and then the feature in the process that addresses the problem is described.

Figure 5:
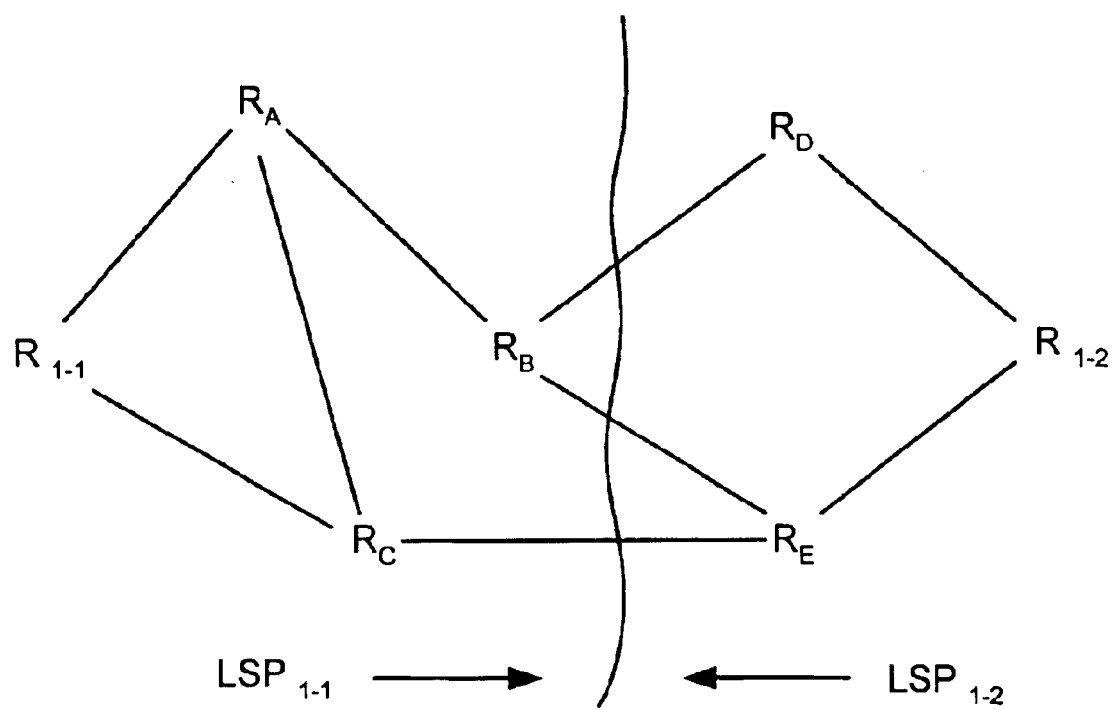
FIG. 5 is a diagram showing a potentially problematic flow of LSPs in a network that is addressed by the process of FIG. 4.

Referring to FIG. 5, two routers $R_{1-1}$ and $R_{1-2}$ are using the same ID. All paths between routers $R_{1-1}$ and router $R_{1-2}$ pass through some subset of a collection of routers, shown as routers $R_A$, $R_B$, $R_C$, $R_D$, and $R_E$. $LSP_{1-1}$ is generated by router $R_{1-1}$ and propagates toward router $R_{1-2}$. Similarly, $LSP_{1-2}$ is generated by router $R_{1-2}$ and propagates toward router $R_{1-1}$. Let it be assumed that $LSP_{1-2}$ has been received by routers $R_D$ and $R_E$ and resides in their respective databases, and that $LSP_{1-1}$ has been received by routers $R_A$, $R_B$, and $R_C$ and resides in their respective databases.

When one of the routers $R_A$, $R_B$, or $R_C$ sends $LSP_{1-1}$ to one of the routers $R_D$ or $R_E$, the receiving router compares the SN 34 of $LSP_{1-1}$ to the SN 34 of $LSP_{1-2}$, which is stored in the router's database. If the SN of $LSP_{1-1}$ is less than or equal to the SN of $LSP_{1-2}$, the router concludes that $LSP_{1-2}$ is the most recent LSP from router $R_{1-2}$, and $LSP_{1-1}$ is not propagated any further. A similar process occurs at the routers $R_A$, $R_B$, and $R_C$ with respect to $LSP_{1-2}$. Thus, if it should happen that $LSP_{1-1}$ and $LSP_{1-2}$ have equal sequence numbers, then neither LSP is propagated any further. As a result, neither router $R_{1-1}$ nor router $R_{1-2}$ receives the other router's LSP, so neither router obtains the information it needs to detect the existence of the duplicate ID.

This potential problem is addressed by the use of the concatenated value SN|CK in deciding which of two LSPs is more recent. The value SN|CK has several properties that are useful for this purpose. To begin with, the sequence number SN dominates the comparison by virtue of occupying the more significant position. Thus, an LSP with a greater SN 34 is deemed the more recent, regardless of the CK values 38. As long as routers are using different SN values 34, only one LSP is seen as the more recent. The router using the smaller SN 34 eventually receives the LSP with the higher SN 34 and concludes that a duplicate ID is in use.

The checksum CK 38 serves as a "tie breaker" when the SN values 34 of two LSPs are equal. CK 38 is calculated over most of the contents of the LSP, including the neighbor ID values and the random number 36 generated specifically for the LSP by the originating router. Generally, even if the ID and SN of two LSPs are equal, it is likely that the CK values of LSPs from different routers are different, because routers generally have different sets of neighbors. Thus, if the CK values are different, it can be inferred that the LSPs have been originated by different routers. In the process of FIG. 4, differences in the CK values are detected by the use of CK as the least significant part of SN|CK. The LSP having a higher CK value (assuming the SN values are equal) is kept or propagated, while the LSP with the lower CK value is replaced or ignored. This comparison is not done because the CK conveys sequence information; it generally does not.

Rather, it is simply one way of assuring that all routers choose the same LSP for keeping/propagating in the network. In alternative embodiments, there may be other ways of meeting this need for deterministic operation.

The random number 36 included in the LSP (FIG. 3) also helps with tie-breaking. In the absence of any randomization, LSPs from different routers may have the same CK values, because of weakness in the checksum redundancy or because the routers have identical LSPs by virtue of connecting to the same neighbors. This condition may last for a significant time, because the contents of a router's LSP (other than SN) are generally fairly static. By including a random number in the calculation of the CK for each new LSP, the chances that LSPs from two different routers have the same CK value are greatly reduced.

A method for the automatic selection of unique identifiers has been shown. It will be apparent to those skilled in the art that modifications to and variations of the above-described technique are possible without departing from the inventive concepts disclosed herein. Accordingly, the invention should not be viewed as limited except by the full scope and spirit of the appended claims.

What is claimed is:

1. A method by which a router ensures the uniqueness of an identifier used to identify the router in routing protocol messages (RPMs) originated by the router in a network, comprising:

for each of a plurality of routing protocol messages (RPMs) received by the router, determining whether an identifier $ID_R$ in the received RPM is the same as an identifier IDs currently used by the router to identify itself in RPMs originated by the router;

comparing sequence information in an RPM most recently originated by the router with sequence information in each of a plurality of the received RPMs for which the identifier $ID_R$ is determined to be the same as the identifier $ID_S$, the result of each comparison indicating whether the received RPM appears to have been originated more recently than the RPM most recently originated by the router;

determining whether those RPMs having an identifier $ID_R$ that is the same as the identifier $ID_S$ and appearing to have been originated more recently than the RPM most recently originated by the router are being received at a rate above a predetermined threshold rate; and upon determining that such RPMs are being received at a rate above the predetermined threshold rate, selecting an identifier different from the identifier $ID_S$ for subsequent use in identifying the router in routing protocol messages originated by the router.

2. A method according to claim 1, wherein the sequence information in each RPM includes a sequence number, and wherein the sequence numbers in a sequence of RPMs originated by the router change monotonically.

3. A method according to claim 2, wherein the sequence information in each RPM further includes a checksum calculated from predetermined contents of the RPM.

4. A method according to claim 3, wherein each RPM further includes a random number tending to differentiate the RPMs from each other, and wherein the random number is included in the predetermined contents of the RPM from which the checksum is calculated.

5. A method according to claim 3, wherein for each RPM the sequence number forms a more-significant part of the sequence information and the checksum forms a less-significant part of the sequence information.

6. A method according to claim 2, wherein the sequence numbers in the sequence of RPMs originated by the router increase monotonically.

7. A method according to claim 1, wherein the RPMs are link state messages.

8. A router capable of ensuring the uniqueness of an identifier used to identify the router in routing protocol messages (RPMs) originated by the router in a network, the router being operative to:

determine, for each, of a plurality of routing protocol messages (RPMs) received by the router, whether an identifier $ID_R$ in the received RPM is the same as an identifier $ID_S$ currently used by the router to identify itself in RPMs originated by the router;

compare sequence information in an RPM most recently originated by the router with sequence information in each of a plurality of the received RPMs for which the identifier $ID_R$ is determined to be the same as the identifier $ID_S$, the result of each comparison indicating whether the received RPM appears to have been originated more recently than the RPM most recently originated by the router;

determine whether those RPMs having an identifier $ID_R$ that is the same as the identifier $ID_S$ and appearing to have been originated more recently than the RPM most recently originated by the router are being received at a rate above a predetermined threshold rate; and upon determining that such RPMs are being received at a rate above the predetermined threshold rate, select an identifier different from the identifier $ID_S$ for subsequent use in identifying the router in routing protocol messages originated by the router.

9. A computer program product including a computer readable medium, the computer readable medium having a routing program stored thereon, the routing program comprising:

program code for determining, for each of a plurality of routing protocol messages (RPMs) received by the router, whether an identifier $ID_R$ in the received RPM is the same as an identifier $ID_S$ currently used by the router to identify itself in RPMs originated by the router;

program code for comparing sequence information in an RPM most recently originated by the router with sequence information in each of a plurality of the received RPMs for which the identifier $ID_R$ is determined to be the same as the identifier $ID_S$, the result of each comparison indicating whether the received RPM appears to have been originated more recently than the RPM most recently originated by the router;

program code for determining whether those RPMs having an identifier $ID_R$ that is the same as the identifier $ID_S$ and appearing to have been originated more recently than the RPM most recently originated by the router are being received at a rate above a predetermined threshold rate; and program code for selecting, upon determining that such RPMs are being received at a rate above the predetermined threshold rate, an identifier different from the identifier $ID_S$ for subsequent use in identifying the router in routing protocol messages originated by the router.

10. A computer data signal embodied in a transmission medium including a routing program for execution in a computer functioning as a router in a network, the routing program comprising:

program code for determining, for each of a plurality of routing protocol messages (RPMs) received by the router, whether an identifier $ID_R$ in the received RPM is the same as an identifier $ID_S$ currently used by the router to identify itself in RPMs originated by the router;

program code for comparing sequence information in an RPM most recently originated by the router with sequence information in each of a plurality of the received RPMs for which the identifier $LID_R$ is determined to be the same as the identifier $ID_S$, the result of each comparison indicating whether the received RPM appears to have been originated more recently than the RPM most recently originated by the router;

program code for determining whether those RPMs having an identifier $ID_R$ that is the same as the identifier $ID_S$ and appearing to have been originated more recently than the RPM most recently originated by the router are being received at a rate above a predetermined threshold rate; and program code for selecting, upon determining that such RPMs are being received at a rate above the predetermined threshold rate, an identifier different from the identifier $ID_S$ for subsequent use in identifying the router in routing protocol messages originated by the router.

11. A router capable of ensuring the uniqueness of an identifier used to identify the router in routing protocol messages (RPMs) originated by the router in a network, comprising:

means for determining, for each of a plurality of routing protocol messages (RPMs) received by the router, whether an identifier $ID_R$ in the received RPM is the same as an identifier $ID_S$ currently used by the router to identify itself in RPMs originated by the router;

means for comparing sequence information in an RPM most recently originated by the router with sequence information in each of a plurality of the received RPMs for which the identifier $ID_R$ is determined to be the same as the identifier $ID_S$, the result of each comparison indicating whether the received RPM appears to have been originated more recently than the RPM most recently originated by the router;

means for determining whether those RPMs having an identifier $ID_R$ that is the same as the identifier $ID_S$ and appearing to have been originated more recently than the RPM most recently originated by the router are being received at a rate above a predetermined threshold rate; and means for selecting, upon determining that such RPMs are being received at a rate above the predetermined threshold rate, an identifier different from the identifier $ID_S$ for subsequent use in identifying the router in routing protocol messages originated by the router.

* * * * *